US008867405B2

(12) United States Patent
Yu et al.

(10) Patent No.: US 8,867,405 B2
(45) Date of Patent: Oct. 21, 2014

(54) VOICE SERVICE DISCOVERY

(75) Inventors: Allen Yuk Leung Yu, San Dimas, CA (US); Razmik Mampourian, West Covina, CA (US); Shuchuan Yao, Irvine, CA (US)

(73) Assignee: Cisco Technology, Inc., San Jose, CA (US)

( * ) Notice: Subject to any disclaimer, the term of this patent is extended or adjusted under 35 U.S.C. 154(b) by 96 days.

(21) Appl. No.: 13/436,295

(22) Filed: Mar. 30, 2012

(65) Prior Publication Data
US 2013/0259027 A1    Oct. 3, 2013

(51) Int. Cl.
*H04L 12/28* (2006.01)
(52) U.S. Cl.
USPC .............................. 370/254; 370/352; 370/401
(58) Field of Classification Search
CPC ......... H04L 41/12; H04L 45/02; H04L 45/00; H04L 45/04; H04L 41/04; H04L 12/64; H04L 65/102; H04L 29/06176; H04L 12/66; H04L 2012/46; H04L 12/46; H04L 12/44; H04L 2012/561; H04L 2012/644
USPC .................................. 370/254, 352, 401, 425
See application file for complete search history.

(56) References Cited

U.S. PATENT DOCUMENTS

| 7,974,272 | B2 | 7/2011 | Chang et al. |
| 8,130,769 | B2 * | 3/2012 | West et al. .................... 370/401 |
| 2007/0018845 | A1 * | 1/2007 | Sutardja .................. 340/825.69 |
| 2008/0030362 | A1 | 2/2008 | Huang et al. |

OTHER PUBLICATIONS

Cisco Small Business 300 Series Managed Switch Administration Guide Release 1.1, accessedldownloaded on Dec. 6, 2011 (pp. 1 to 411).*
Catalyst 2940 Switch Software Configuration Guide Ch. 15, accessedldownloaded on Dec. 6, 2011 (pp. 15-1 to 15-6).*
Cisco Small Business 300 Series Managed Switch Administration Guide Release 1.1, accessed/downloaded on Dec. 6, 2011 ( pp. 1 to 411).
Catalyst 2940 Switch Software Configuration Guide Ch. 15, accessed/downloaded on Dec. 6, 2011 (pp. 15-1 to 15-6).

* cited by examiner

*Primary Examiner* — Xavier Szewai Wong
*Assistant Examiner* — Natali N Pascual Peguero
(74) *Attorney, Agent, or Firm* — Brinks Gilson & Lione

(57) ABSTRACT

In one implementation, voice service discovery may include a voice service discovery protocol (VSDP) and a VSDP device, which receives voice virtual local area network data and generates a packet including root voice service configuration data. The VSDP device may be in an enabled state, a listening state, or a disabled state. Receiving voice service configuration data may initiate the enabled state in the VSDP device, and the packet may be transmitted to a remote device. Voice service discovery may include advertising a voice service to a plurality of voice over internet protocol endpoints according to the root voice service configuration data.

19 Claims, 9 Drawing Sheets

VOICE SERVICE DISCOVERY

FIELD

The present embodiments relate to voice service discovery in virtual local area networks (VLANs).

BACKGROUND

Virtual local area networks (VLANs) allow network nodes to be connected and grouped together regardless of the physical locations of the nodes. Nodes may be added to a VLAN through software configuration rather than physical relocation of the nodes. Nodes may include, for example, network connectivity devices and endpoints. Network connectivity devices may include, for example, switches and routers. Network connectivity devices do not dynamically adapt to changes of a voice service deployed over a voice VLAN, and to the addition, deletion, and relocation of network connectivity devices, voice over internet protocol (VoIP) endpoints, and VoIP servers that subscribe to and provide the voice service. Instead, implementing changes to voice service information requires manual configuration of all the network connectivity devices. Therefore, the configuration process may be daunting and error-prone. Continued network management is also required when new devices, such as VoIP devices and endpoints, are added, deleted, or moved.

DETAILED DESCRIPTION

Overview

Figure 1:
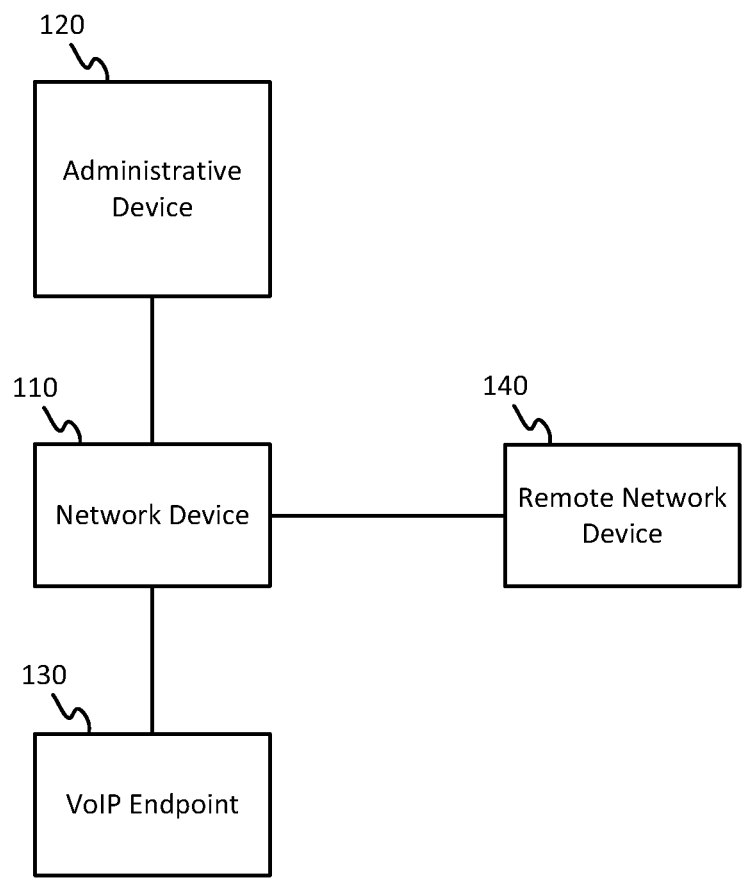
FIG. 1 illustrates an embodiment of a voice VLAN with voice service discovery.

In one aspect, a method includes receiving a voice service configuration data at a network device from an administrative device, where the network device is in a listening state, initiating, based on the received voice service configuration data, an enabled state of the network device, generating a packet including a root voice service configuration data for a remote network device, and transmitting the packet to the remote network device, wherein a voice service is advertised to a plurality of voice over internet protocol (VoIP) endpoints according to the root voice service configuration data.

In a second aspect, a network device includes an interface, a memory, and a processor. The interface is configured to a received voice service configuration data from an administrative device, where the network device is in a listening state. The memory is configured to store the received voice service configuration data. The processor is configured to initiate an enabled state of the network device based on the received voice service configuration data, and generate a packet including a root voice service configuration data for a remote network device, wherein a voice service is advertised to a plurality of voice over internet protocol (VoIP) endpoints according to the root voice service configuration data.

In a third aspect, a non-transitory computer readable storage medium is encoded with instructions capable of being executed by a computer to receive a voice service configuration data at a network device from an administrative device, wherein the voice VLAN includes the network device and the network device is in a listening state, initiate, based on the received voice service configuration data, an enabled state of the network device, generate a packet including a root voice service configuration data for a remote network device, and transmit the packet to the remote network device, wherein a voice service is advertised to a plurality of voice over internet protocol (VoIP) endpoints connected to the remote network device.

Example Embodiments

Deploying a voice over internet protocol (VoIP) service in a virtual bridged local area network may involve the configuration of voice service information such as voice virtual local area network (VLAN), voice VLAN port memberships, and quality of service (QoS) for voice traffic on each network connectivity device within the network. Additional configuration of link layer network policy may also be necessary on network connectivity devices that advertise voice service information to directly connected VoIP endpoints. Voice service information may include voice service configuration data, voice VLAN configuration data and other information for voice service.

Certain link layer protocols, such as Link Layer Discovery Protocol for Media Endpoints (LLDP-MED), advertise voice service information to directly connected neighboring devices. These link layer protocols do not consider the propagation of the voice service information through intermediate devices to devices that are further away. Other link layer protocols, such as VTP (VLAN Trunking Protocol) and GVRP (GARP VLAN Registration Protocol), propagate VLAN information in a bridged VLAN but do not identify voice VLANs and quality of service (QoS) associated with the voice VLANs. Moreover, devices may behave differently when receiving protocol data units (PDU) from unsupported link layer protocols. In general, however, when a device receives a PDU of an unsupported protocol, the device may discard the PDU or flood the PDU. The behavior of devices may vary depending on manufacturer, product models, and the protocol used. As a result, devices cannot be relied upon to deliver voice service configuration to other devices that are further away using link layer protocol.

The following embodiments describe a voice service discovery protocol (VSDP) configured to operate on the network layer (layer 3) of the Open Systems Interconnection (OSI) model. A network device that is configured, or equipped, for VSDP may dynamically deploy VoIP services across an entire internet protocol (IP) network through propagation of voice service information between VSDP capable network connectivity devices in the network. Propagation of voice service information may allow VSDP devices to learn about voice services deployed in network from other VSDP devices in the network. VSDP devices in turn can advertise voice service information using link layer protocols to voice endpoints, such as VoIP phones, that are directly connected to the VSDP devices. VoIP phones may be standalone devices or integrated in another device such as a personal computer.

VSDP devices may discover voice service information from other VSDP devices in an IP network. VSDP devices may be connectivity devices such as OSI link layer (layer 2) switches, multilayer switches, and/or IP switch routers. VSDP devices that reside in the same IP subnet, or that are interconnected through VSDP capable routers, may exchange voice service information without the constraints of the link layer protocols described above. As a result, voice service discovery with VSDP devices may require less manual configuration (e.g., minimal, or no, manual configuration) and continued network management for the addition, deletion, and relocation of VSDP devices and VoIP endpoints than is required with devices that only use link layer (layer 2) discovery protocols.

FIG. 1 illustrates an embodiment of voice service discovery using voice service discovery protocol. The network device 110 may be a voice service discovery protocol (VSDP) device, which is a device equipped for VSDP. The network device 110 may receive voice service information, or voice service configuration data, from an administrative device 120, and send voice service information, or voice service configuration data, to a voice over internet protocol (VoIP) endpoint 130 or to a remote network device 140. Other embodiments may include fewer, additional or other administrative devices, network devices, VoIP endpoints and remote network devices.

The network device 110 may receive voice service configuration data from the administrative device 120, where the network device 110 is in a listening state. The network device 110 may initiate, based on the voice service configuration data, an enabled state of the network device 110. When in the enabled state, the network device 110 may generate a packet for a remote network device and transmit the packet to the remote network device. The packet includes voice service configuration data of a VSDP root device, which may be elected by a root election process described below. A voice service may be advertised to multiple voice over internet protocol (VoIP) endpoints 130 according to the voice service configuration data. The network device 110 may broadcast or multicast the packet to internet protocol subnets directly connected to the network device 110. The voice service configuration data may include a source priority value, a voice VLAN identifier, an 802.1p priority and a differentiated services code point for the voice VLAN. The voice service configuration data may include fewer, additional or different data.

Voice service discovery may include a root election process for electing a VSDP root device. Using the root election process, each VSDP device continuously compares voice service advertisements, or voice service configuration data, received from other VSDP devices and administrative devices to elect a VSDP root device and corresponding root voice service configuration based on the VSDP identifier (VSDP ID) for each VSDP device. Each VSDP device may use the root election process to elect the device with the smallest VSPD-ID as the VSDP root device. The root election process is described in more detail below.

The network device 110 may compare source priority values as part of the root election process. For example, the network device 110 accesses a current source priority value from a memory of the network device 110 and access a received source priority value from the received voice service configuration data. The current source priority value may correspond to the VSDP root device and root voice service configuration stored in the memory of the network device 110. The network device 110 may update, when the received source priority value is less than the current source priority value, the root voice service configuration data based on the received voice service configuration data. The received source priority value may correspond to a device that is remote to the network device 110, a device that is local to the network device 110, or manual configuration.

If the current source priority value is equal to the received source priority value, the network device 110 may access a hardware address from a memory of the network device 110 and access another hardware address from the received voice service configuration data. The hardware address may correspond to a VSDP root device and a root voice service configuration stored in the memory of the network device 110. The network device 110 may update, when the other hardware address is smaller than the hardware address, the root voice service configuration data based on the received voice service configuration data.

The network device 110 may be a VSDP device that sends, receives, and/or processes information, which may be in the form of VSDP Packets. The administrative device 120 may be a computer device, a voice server, a voice gateway, or another network device. The VoIP endpoint may be a VoIP phone, access point or other VoIP device.

VSDP devices may be configured to operate in multiple modes or states. For example, the multiple states may include a disabled state, a listening state, or an enabled state. Default state for a VSDP device may be listening state. When in the listening state, a VSDP device may receive and process incoming VSDP packets, but does not send VSDP packets. When in the enabled state, a VSDP device may send, receive, and/or process incoming VSDP packets. When in the disabled state, a VSDP device does not send VSDP packets and does not process any incoming VSDP packets. Default configuration values for a VSDP device, when operating in disabled state or listening state, may include: voice VLAN=1, QoS, Differentiated Services Code Point (DSCP)=46 and VLAN 802.1p priority=5. VSDP devices may include a memory and/or a database to store information regarding, for example: local and/or remote voice service configuration, local and/or remote source priorities, hardware MAC addresses, root voice service configurations and source priorities, VSDP root device, and shortest path-to-root. VSDP devices may store information regarding fewer, additional, or other features.

VSDP devices may enter the enabled state from the listening state based on a state change event. Various state change events may be defined and stored in the VSDP device. One state change event may be receiving a voice service advertisement from a non-VSDP device. Another state change event may be receiving a manual configuration with a new voice VLAN, and/or new QoS. For example, a manual configuration may be done through a command line interface or a graphical user interface. Another state change event may be receiving a voice service advertisement from a VSDP device.

VSDP packets may include VSDP voice service advertisements, which may be encoded in a VSDP configuration message. A VSDP configuration message may include, for example, the following information: type, version, refresh-age-timeout, refresh-flag, refresh-flag, root-mac-address, cost, transm-address, transm-interface, voice-vlan-id, voice-vlan-vpt, voice-vlan-dscp, md5-auth, and a root VSDP-ID. Other implementations may include additional, fewer or different information.

"Type" may indicate the type of message, where "0" may indicate that the message is a VSDP Configuration Message, and "1" may indicate that the message is a VSDP Refresh Message. Other values may be used to indicate other types of messages. "Version" may indicate the version of VSDP for which the message was created. "Refresh-age-timeout" may be the period of time that device stays in refresh phase. When the "refresh-flag" is set to "1," the VSDP device receiving the message enters refresh phase, which resets the VSDP configuration on the device to the default VSDP configuration. "Cost" may indicate the number of hops, or the accumulated costs, required to transmit the message between the VSDP device and the root VSDP device, or "cost" may be manually configured. "Transm-address" may indicate the smallest internet protocol (IP) address configured on the transmitting VSDP device for the outgoing interface, such as a port. "Transm-interface" may identify the outgoing IP interface on the transmitting VSDP device from which the VSDP configuration message is being sent. "Voice-vlan-id" may be the voice VLAN identifier. "Voice-vlan-vpt" may indicate the VLAN 802.1p priority expected on the voice traffic in the voice VLAN. "Voice-vlan-dscp" may indicate the QoS DSCP value expected on the voice traffic in the voice VLAN. "Md5-auth" may be used to authenticate the message.

The root VSDP-ID is the VSDP-ID of the VSDP root device. A VSDP-ID identifies a VSDP device and its priority. A VSDP-ID is the concatenation of the VSDP device's source priority and the MAC address of the VSDP device. A VSDP device may use the same MAC address, which may be a base MAC address, in the VSDP device's VSDP-IDs. "Source priority" may indicate the state and source of the voice VLAN configuration, or voice service information, on a VSDP device. Sources of voice service configuration may include manual/static configuration, voice service advertisement from a device configured to run VSDP, and voice service advertisement from a non-VSDP device, which is a network device, such as a switch or a router that does not support VSDP. Source priority values may include, for example, "0" to indicate the VSDP device being manual/static configured with the voice service is active, "1" to indicate the original remote VSDP device with the manual/static configuration becomes passive; "2" to indicate the local non-VSDP device advertising the voice service in link layer protocol is active, "3" to indicate the local non-VSDP device advertising the voice service has become passive or the original remote VSDP device that advertises the voice service it receives from a local non-VSDP device have become passive; and "6" to indicate an active VSDP default configuration.

Voice service advertisements from non-VSDP devices and manual voice service configurations may be regarded as local sources with respect to the VSDP device. Voice service advertisements from other VSDP devices may be regarded as remote sources with respect to the VSDP device. Advertisements may be made, for example, by multicast or broadcast. The VSDP device may be configured to advertise to a subset of devices in IP subnets that are directly connected to the VSDP device. Alternatively, the VSDP device may be configured to advertise to entire IP subnets that are directly connected to the VSDP device.

Local sources may further be described as active or passive. A local source is active when the VSDP device receives voice service configuration directly from the local source. A local source is passive when the local source is aged out after a certain period of time of inactivity. The period of time may be based on a parameter that is defined by the discovery protocol being used and is stored in a memory or database of the VSDP device. When a local source is aged out and the local source is not the source of the root voice service configuration, a VSDP device may remove the local source and the associated voice service configuration from the VSDP device's memory or database. If the local source is the source of the root voice service configuration, a root VSDP device may change the state of the local source from active to passive. For example, when a non-VSDP device actively sends voice service advertisements to a VSDP device, the VSDP devices stores the voice service advertisements with a source priority of 2. When the non-VSDP device stops sending voice service advertisements, the VSDP device sets the source priority of the voice service advertisement to 3. Examples of VSDP device parameters are discussed more fully below. In general, the voice service configuration is rarely changed.

A description of the VSDP root election process follows. Each VSDP device independently elects a VSDP root device. The voice service configuration for a set of VSDP devices becomes stable when all of the VSDP devices have elected the same VSDP device as the VSDP root device. The set of VSDP devices may be VSDP devices in the same IP subnets and in different IP subnets connected by VSDP capable routers. The VSDP root device is the VSDP device that has the smallest VSDP identifier (VSDP ID) among all the VSDP devices advertising voice service configurations. A VSDP ID includes the source priority of the voice service configuration and the base MAC address of the VSDP device. The base mac address in the VSDP ID of a local source is the base mac address of the VSDP device that receives the configuration from the local source. VSDP devices run the root election whenever an election process trigger event occurs. An election process trigger event may include, for example, addition or deletion of local sources to the VSDP device, aging of local or remote sources, incoming VSDP advertisements, and changes through manual configurations.

Figure 2:
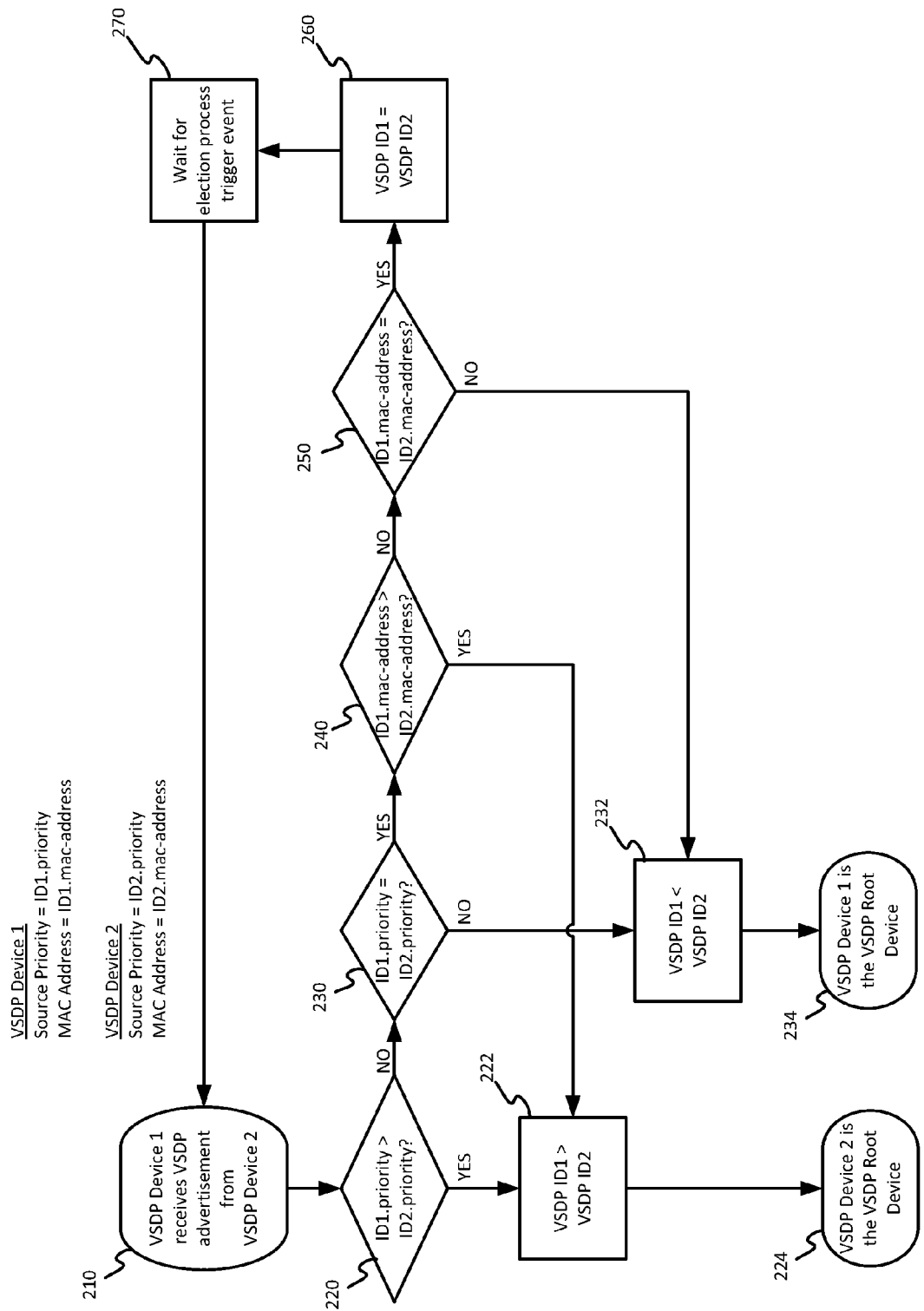
FIG. 2 illustrates an example of a flow chart for root election.

FIG. 2 illustrates an example of a flow chart for root election. This example illustrates root election in a network with only two devices, VSDP Device 1 and VSDP Device 2. The VSDP device with the lowest VSDP ID is elected as the root device. Root election may be performed in a similar fashion with any number of devices. VSDP Device 1 receives a VSDP advertisement from VSDP Device 2 at 210. VSDP Device 1 elects the root device by comparing the source priority ID1.priority of the root voice service configuration currently stored in the memory of VSDP Device 1 to the source priority ID2.priority from the advertisement received from VSDP Device 2. If ID1.priority is greater than ID2.priority at 220, then the VSDP ID of Device 1 is greater than the VSDP ID of Device 2 at 222, and VSDP Device 2 is elected as the root device at 224. If ID1.priority is not greater than ID2.priority at 220 and is not equal to ID2.priority at 230, then ID1.priority must be less than ID2.priority at 232, and the VSDP ID of Device 2 is greater than the VSDP ID of Device 1 at 232. So, VSDP Device 1 is elected as the root device at 234.

If the priorities are equal at 230, then VSDP Device 1 compares the MAC address ID1.mac-address of the root voice service configuration stored in the memory of VSDP Device 1 with the MAC address ID2.mac-address from the advertisement received from VSDP Device 2. If ID1.mac-address is greater than ID2.mac-address at 240, then the VSDP ID of Device 1 is greater than VSDP ID of Device 2 at 222, and VSDP Device 2 is the root device. If the MAC addresses are not equal at 250, then the ID1.mac-address must be less than ID2.mac-address, and the VSDP ID of Device 1 is less than the VSDP ID of Device 2 at 232, and VSDP Device 1 is the root device at 234. If the MAC addresses are equal at 250, then VSDP ID1 equals VSDP ID2 at 260, and no change to the VSDP root device is necessary until the next election process trigger event at 270. Other implementations may involve more than two VSDP devices, and each device may use the algorithm as shown in FIG. 2 to elect a root device. The voice service configuration is stable when all VSDP devices in the voice VLAN elect the same VSDP root device.

The following is a description of how VSDP may designate a VSDP device as a VSDP backup root device when the VSDP root device is out of service or otherwise unavailable, for example, due to disconnection. The VSDP device will age out the VSDP root device if the VSDP device does not receive any voice service advertisement containing the root voice service configuration from the VSDP root device for a certain period of time. When the VSDP device ages out the VSDP root device, the VSDP device takes over the root voice service configuration as the VSDP device's own configuration by changing the source priority of the root voice service configuration from active to passive, and changes the base MAC address of the root voice service configuration from the base MAC address of the VSDP root device to the base MAC address of the VSDP device. For example, if the source of the root voice service configuration was an active manual configuration with a source priority of 0, the VSDP device changes the source priority to 1, indicating that the source is now passive. Alternatively, if the source of the root voice service configuration was an advertisement from a non-VSDP device (e.g., a link layer protocol device) with a source priority of 2, the VSDP device changes the source priority to 3, indicating the source is now passive. Accordingly, the VSDP device will advertise the VSDP device as the VSDP root device and advertise the VSDP device's preferred or best voice service configuration as the new root voice service configuration. If all other VSDP devices in the voice VLAN also elect the VSDP device as the VSDP root device, and if the root voice service configuration originates from a remote source that has become passive, then the VSDP device becomes the VSDP backup root device. When the original VSDP root device is back in service, or otherwise becomes available again, the original VSDP root device begins to advertise the voice service configuration again. Thus, other VSDP devices may re-elect the VSDP root device.

When the listening state is initiated on a VSDP device and the VSDP device receives voice service configuration from a local source and the VSDP device elects itself as the VSDP root device, the VSDP device starts advertising itself as the VSDP root device with the root voice service configuration. The VSDP device continues to advertise itself as the VSDP root device to other VSDP devices in directly connected IP subnets until the VSDP device elects another VSDP device as the VSDP root device. VSDP devices use the voice service configuration advertised by the elected VSDP root device for the voice service in the network. As a result, the VSDP devices may be dynamically configured, which is without manual configuration. The voice service configuration from the VSDP root device is the root voice service configuration.

Each VSDP device maintains a set of parameters for the operation of VSDP, and the parameters may include, for example: robustness, hello-time, root-age-timeout, path-age-timeout, root-voice-vlan-delay-timeout, max-refresh-message, and refresh-hello-time. "Robustness" may indicate the number of VSDP messages to be sent or received, and may be used to tune for expected VSDP message loss in the network. "Robustness" may be set to 3. "Hello-Time" may indicate the time interval at which the VSDP root device periodically sends VSDP configuration messages, and the default value may be 5 seconds. "Max-refresh-message" may be the number of VSDP messages to send during the refresh phase, and the default may be 3. "Refresh-hello-time" may be the time interval between sending of periodic VSDP refresh messages, and the default may be 1 second.

"Root-age-timeout" is the time since the VSDP device last receives a VSDP configuration message advertising a VSDP root device and root voice service configuration message, and the time after which the VSDP device ages out the VSDP root device. When a VSDP device that is not the VSDP root device receives a root voice service configuration from a remote source, the VSDP device may age out the VSDP root device if the VSDP device does not receive any VSDP message advertising VSDP root device and root voice service configuration after a period of root-age-timeout. As shown by Equation 1, root-age-timeout may be defined as:

$$\text{root-age-timeout} = (\text{robustness} + 2) * \text{hello-time} \quad \text{(Eq. 1.)}$$

"Path-age-timeout" is the time since the VSDP device last receives a VSDP configuration message advertising a VSDP root device and root voice service configuration message via the shortest path to the VSDP root device to the time after which the VSDP device ages out the shortest path. As shown in Equation 2, path-age-timeout may be defined as:

$$\text{path-age-timeout} = \text{robustness} * \text{hello-time} \quad \text{(Eq. 2)}$$

"Root-voice-vlan-delay-timeout" is a time delay that begins after a VSDP device elects a VSDP root device. After the root-voice-vlan-delay-timeout expires, the VSDP device can start to use and deploy the root voice service configuration as advertised by the newly elected VSDP root device. As shown in Equation 3, root-voice-vlan-delay-timeout may be defined as:

$$\text{root-voice-vlan-delay-timeout} = \text{robustness} * \text{hello-time} \quad \text{(Eq. 3)}$$

"Refresh-age-timeout" is the duration of the refresh phase. As shown in Equation 4, refresh-age-timeout may be defined as:

$$\text{refresh-age-timeout} = 2 * \text{root-age-timeout} \quad \text{(Eq. 4)}$$

The elected VSDP root device may periodically, at every hello-time period, multicast or broadcast VSDP advertisements into all IP subnet(s) that are directly connected to the VSDP root device. A VSDP device propagates the root device advertisements received from the VSDP shortest-path-to-root to all other IP subnet(s), if any, excluding the incoming IP subnet. Interfaces to the directly connected IP subnets may be, for example, a single port, a link aggregation, or a VLAN with one or two member ports. Other interfaces may also be used. When a VSDP device forwards the root device's advertisement from an incoming IP subnet to another IP subnet, the VSDP device updates the cost, transm-ip-address, transm-interface, and the md5-auth of the message. If a VSDP device supports bridging, then the incoming packets are also bridged without modification and independently of VSDP. Forwarding loops are avoided based on the VSDP shortest path and the standard spanning tree.

Figure 3:
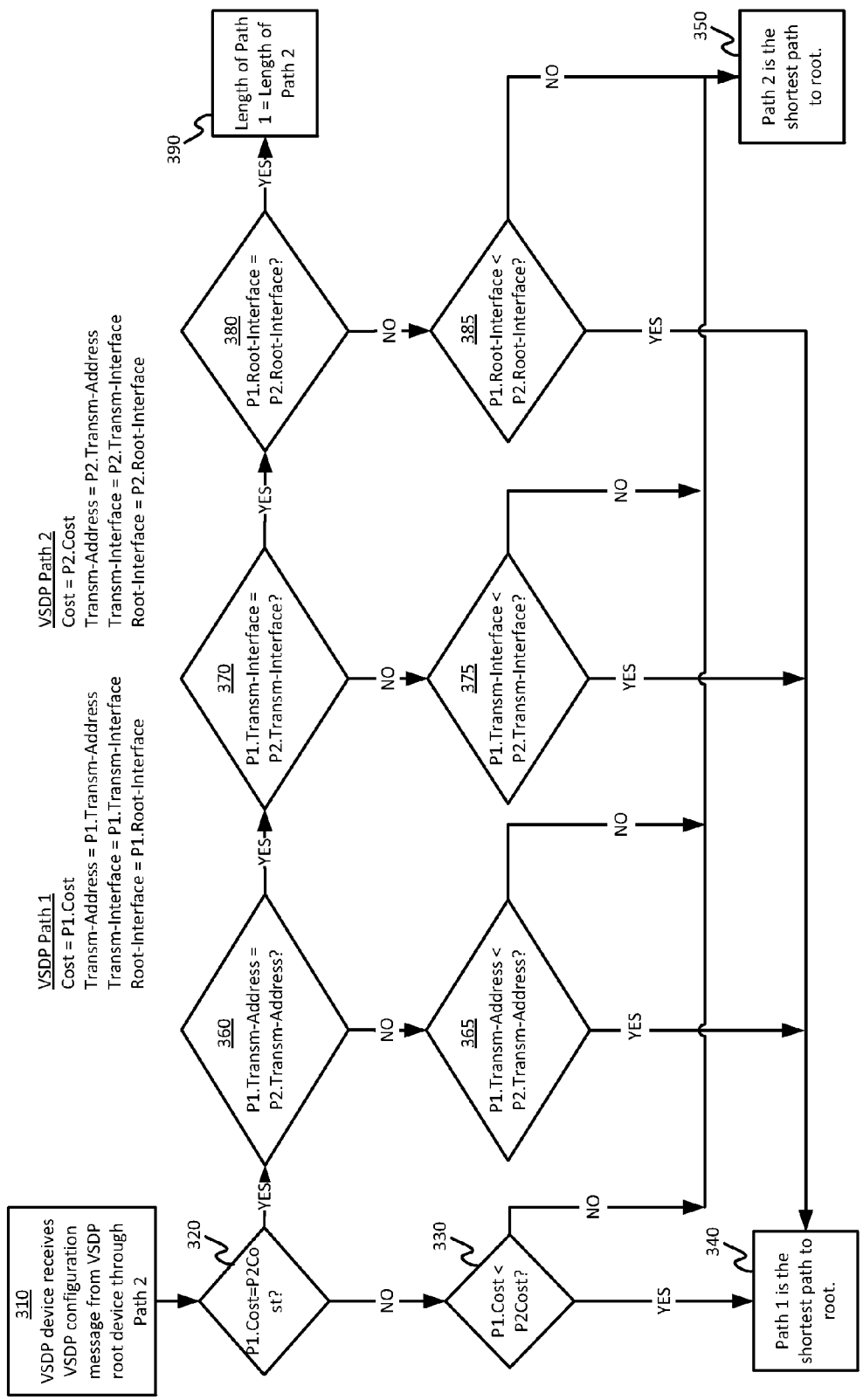
FIG. 3 illustrates an example of a flow chart for determining shortest-path-to-root.

FIG. 3 illustrates an example of a flowchart for determining the shortest-path-to-root. In this example, Path 1 is the current shortest-path-to-root for a VDSP device. At 310, the VSDP device receives a VSDP configuration message through Path 2 from the VSDP root device. The VSDP device determines whether Path 2 is the shortest-path-to-root by comparing Path 2 to Path 1. A path and the path length may be represented by, for example, cost, transm-address and transm-interface in the VSDP configuration message received and the root-interface (the local interface where the VSDP configuration message is received). If the costs, p1.cost and p2.cost, of the paths are not equal at 320, and p1.cost is less than the p2.cost at 330, then path 1 is the shortest-path-to-root at 340. If the cost of p1 is greater than the cost of p2, then path 2 is the shortest-path-to-root at 350. If the cost of p1 is equal to the cost of p2 at 320, then the VSDP device compares the transm-address at 360, and the path with the smallest transm-address at 365 is the shortest-path-to-root. If the transm-address of p1 and p2 are equal at 360, then the VSDP device compares the transm-interface of p1 and p2 at 370, and the path with the smallest transm-interface at 375 is the shortest-path-to-root. If the transm-interface of p1 and p2 are equal at 370, then the VSDP device compares the root-interface at 380, and the path with the smallest root-interface at 385 is the shortest-path-to-root. If the cost, transm-address, transm-interface and root-interface for path 1 and path 2 are all equal, then the length of path 1 equals the length of path 2 at 390.

A VSDP device may store the VSDP ID and voice service configuration of a local source, the VSDP ID and voice service configuration of the VSDP root device, and shortest path-to-root information. When a VSDP device receives a VSDP message and elects a new VSDP root device, the path through which the VSDP message was received is the shortest path-to-root. When a VSDP device receives a VSDP message and the existing VSDP root device remains the VSDP root device, the VSDP device compares the path through which the message was received with the shortest path-to-root stored in memory and stores the shorter path as the new shortest path-to-root. When a VSDP device is the VSDP root device, the shortest path is to itself, and the cost is 0. When a VSDP device ages out its shortest path to the VSDP root device, the VSDP device replaces the shortest path with the path through which the next VSDP configuration message is received. The root voice service configuration may be replaced when a new VSDP root device is elected or the new root voice service configuration is received from the VSDP root device.

When a VSDP device receives a VSDP refresh message, the VSDP device enters the refresh phase, which restarts the VSDP device and resets the voice service configuration to default settings of the VDSP device. A refresh message may contain, for example, the following information: type, version, refresh-age-timeout, and md5-auth. "Type" may indicate type of message, where "1" indicates that the message is a VSDP refresh message. Other values may indicate other types of messages. For example, a VSDP configuration message may be indicated by type=0. "Version" may indicate the version of VSDP for which the message was created. "Refresh-age-timeout" may be the duration that the devices stay in refresh phase. Md5-auth is the authentication of the message.

A VSDP device may enter the refresh phase based on a refresh triggering event. Various refresh initiation events may be defined and stored in the VSDP device. One refresh triggering event may be receiving a request from the administrative device 120 to restart the VSDP process. Another refresh triggering event may be receiving a VSDP refresh message from another VSDP device. Another refresh triggering event may be receiving a VSDP configuration message with refresh-flag set to 1. A VSDP device that starts the refresh phase sends a refresh message toward the VSDP root device through the root interface of the VSDP device's shortest path to the VSDP root device for max-refresh-message number of times. The message is sent every refresh-hello-time. A VSDP device propagates the VSDP refresh message that the VSDP device receives by forwarding the VSDP refresh message toward the VSDP root device through the root interface of the VSDP device's shortest path to the VSDP root device.

VSDP devices that receive the refresh message, including the VSDP root device, stay in refresh phase for the duration of refresh-age-timer. While in refresh phase, the VSDP device forwards the VSDP configuration message as usual but with the refresh-flag set to 1. At the end of the refresh phase, a VSDP device removes from the database all information from the root voice service configuration and the VSDP root device, and enters the initialization state.

VSDP may be implemented as a multicast domain name system service (mDNS service), such as Bonjour. The mDNS service instance may be defined for VSDP as follows: <Instance>="VSDPxxxxxx" (where xxxxxx is the last 3 bytes of the base MAC address of a VSDP device); <Service>="_csco-sb-vsdp._udp"; <Domain>="local."

VSDP messages may be multicast to mDNS multicast IP address 224.0.0.251. VSDP messages may be encoded in domain name system text resource record (DNS TXT RR) as a list of <FieldName>=<FieldValue>. A VSDP message may also contain a MD5 Authentication. If present, its format may be MD5-Auth=<17 octets>. The first octet may contain a binary value of key-id followed by 16 octets of MD5 digest. The MD5 digest may be calculated starting from the beginning of the TXT RR header with all the VSDP fields including MD4-Auth. The key-id may be initialized to the ID of the key used in the calculation, and the MD5 digest may be initialized to zero. A user-defined secret may also be added at the end of the TXT RR for the calculation.

Figure 4:
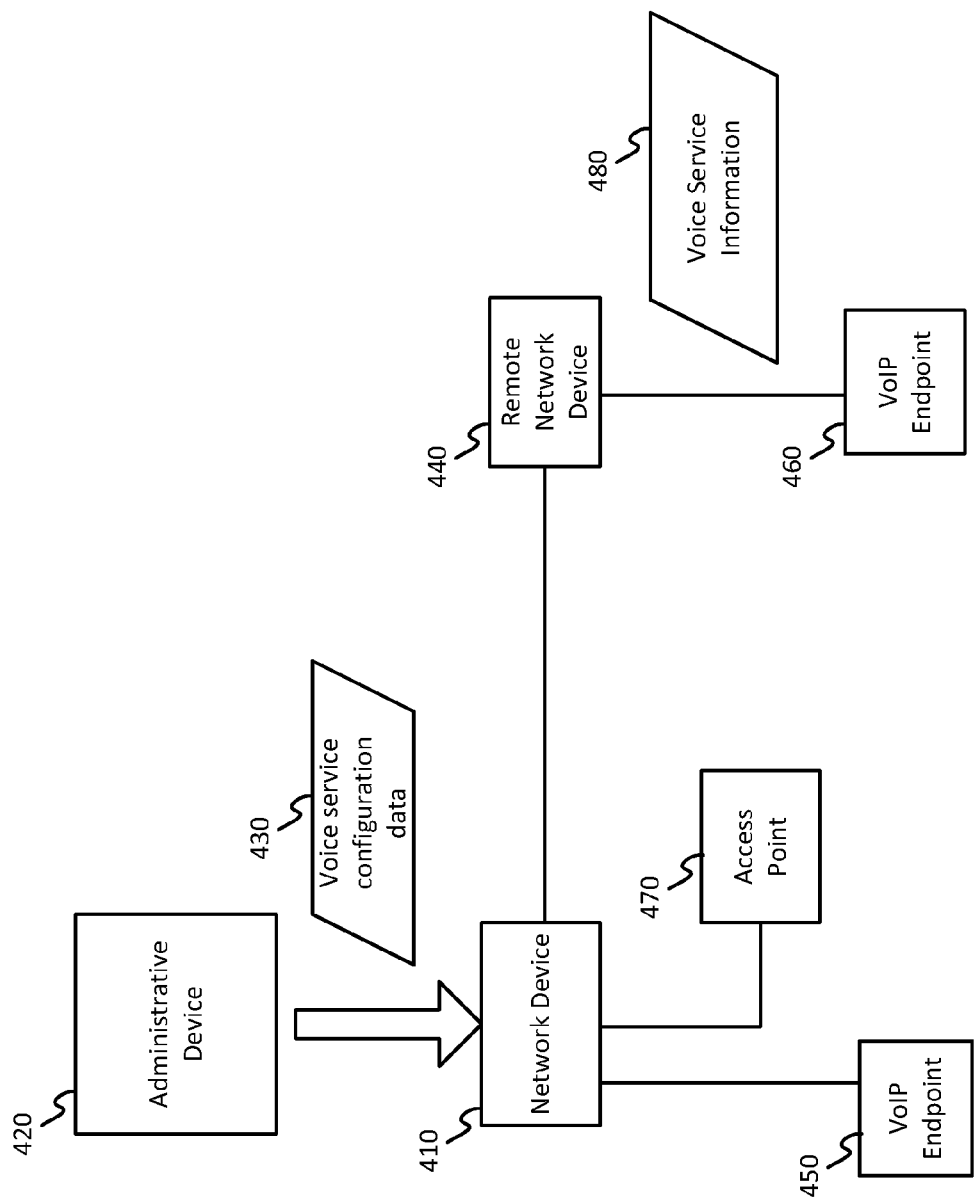
FIG. 4 illustrates an example of a voice VLAN with voice service discovery.

FIG. 4 illustrates an example of a voice VLAN with voice service discovery. The voice VLAN 400 may include a network device 410 which receives voice service configuration data 430 from an administrative device 420. A remote network device 440 may be added to the voice VLAN 400. The voice VLAN 400 may further include VoIP endpoints 450, 460 and access point 470 connected to the network device and/or remote network device.

An example of voice service discovery, using the voice VLAN of FIG. 4, may begin with connecting the network device 410 to the administrative device 420. Then, the administrative device 420 detects that the network device 410 is connected, which may cause the administrative device 420 to automatically advertise (e.g. advertise without manual configuration) voice service configuration data 430 to the network device 410 through a link layer protocol. The network device 410 may include an incoming interface and an outgoing interface, and the interfaces may comprise communication or network ports. When the network device 410 receives the voice service configuration data 430 with voice VLAN 400, the network device 410 automatically (e.g., without manual configuration) configures itself with voice VLAN 400. Network device 410 may elect network device 410 as the VSDP root device and advertise network device 410 and the network device's root voice service configuration in VSDP configuration messages to all IP subnets that are directly connected to the network device 410. When the remote network device 440 receives the VSDP configuration message from the network device 410, the remote network device 440 automatically configures itself with voice VLAN 400. Then, the network device 410 and the remote network device 440 may identify ports that are connected to VoIP endpoints, and add the identified ports to voice VLAN 400. The network device 410 and the remote network device 440 may identify the ports by using, for example, but not limited to, LLDP-MED.

The network device 410 and the remote network device 440 may detect when VoIP endpoints 450, 460 and access point 470 are connected based on link layer advertisements received at ports on the network device 410 and remote network device 440. Then, the network device 410 and remote network device 440 may add the ports that are connected to the VoIP endpoints 450, 460 and access point 470 to voice VLAN 400. As a result, the VoIP endpoints 450, 460 and access point 470 are connected to the voice VLAN 400. The network device 410 and remote network device 440 may advertise voice service information 480 to the endpoints 450, 460 and access point 470 using a link layer protocol, such as CDP or LLDP-MED. Other implementations of voice service discovery and deployment of voice service over voice VLAN may include fewer, additional or different administrative devices, network devices, remote network devices, VoIP endpoints, access point and other hardware or software.

Figure 5:
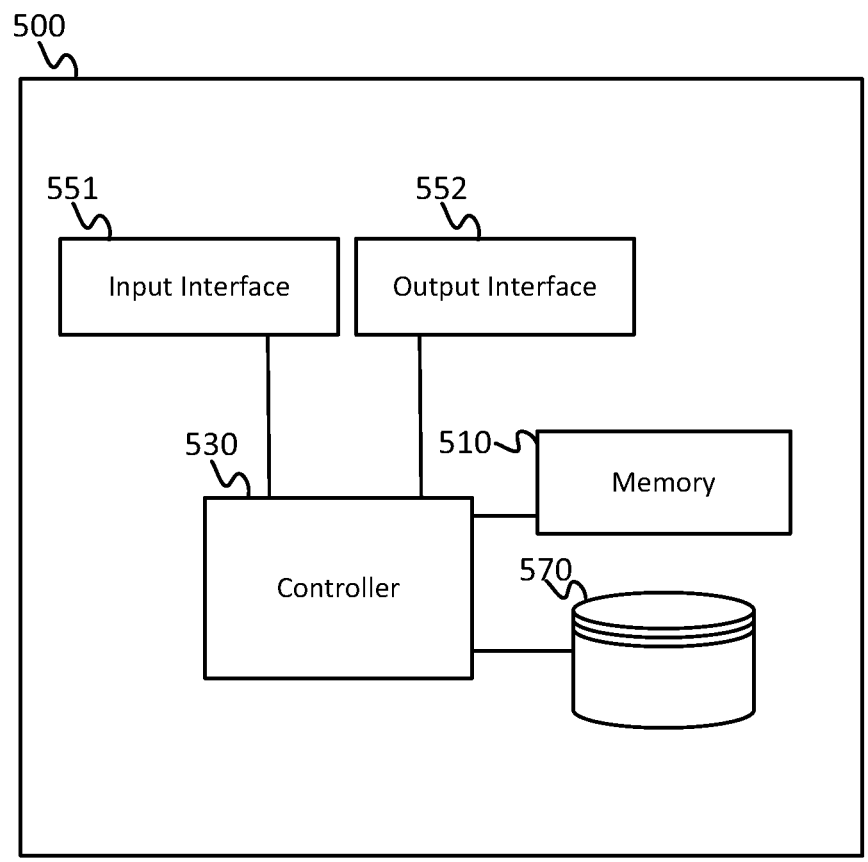
FIG. 5 illustrates an implementation of voice service discovery.

FIG. 5 illustrates a hardware implementation of a network device 500 that is VSDP capable. The network device 500 may be a VSDP device, which is a device configured for VSDP. The network device 500 includes a memory 510, a controller 530, an input/output interface 550. The memory 510 may be a volatile memory or a non-volatile memory. The memory 510 may include one or more of a read only memory (ROM), dynamic random access memory (DRAM), a static random access memory (SRAM), a programmable random access memory (PROM), a flash memory, an electronic erasable program read only memory (EEPROM), static random access memory (RAM), or other type of memory. The memory 510 may include an optical, magnetic (hard drive) or any other form of data storage device. The memory 510 may be located in a remote device or removable, such as a secure digital (SD) memory card. The network device may optionally include an input device.

The memory 510 may store computer executable instructions. The controller 530 may execute computer executable instructions. The computer executable instructions may be included in computer code. The computer code may be stored in the memory 510. The computer code may be written in any computer language, such as C++, C#, Java, Pascal, Visual Basic, Perl, HyperText Markup Language (HTML), JavaScript, assembly language, extensible markup language (XML) and any combination thereof.

The computer code may be instructions encoded in one or more tangible computer readable media or one or more non-transitory computer readable media for execution by the controller 530 or a computer. The computer readable medium may include, but are not limited to, a floppy disk, a hard disk, an application specific integrated circuit (ASIC), a compact disk CD, other optical medium, a random access memory (RAM), a read only memory (ROM), a memory chip or card, a memory stick, and other media from which a computer, a processor or other electronic device can read.

The controller 530 may comprise a general processor, digital signal processor, application specific integrated circuit, field programmable gate array, analog circuit, digital circuit, combinations thereof, or other now known or later developed processor. The controller 530 may be a single device or combinations of devices, such as associated with a network or distributed processing. Any of various processing strategies may be used, such as multi-processing, multi-tasking, parallel processing, remote processing, centralized processing or the like. The controller 530 may be responsive to or operable to execute instructions stored as part of software, hardware, integrated circuits, firmware, micro-code or the like. The functions, acts, methods or tasks illustrated in the figures or described herein may be performed by the controller 530 executing instructions stored in the memory 510. The functions, acts, methods or tasks are independent of the particular type of instructions set, storage media, processor or processing strategy and may be performed by software, hardware, integrated circuits, firmware, micro-code and the like, operating alone or in combination. The instructions are for implementing the processes, techniques, methods, or acts described herein.

The I/O interface 550 may include any operable connection. An operable connection may be one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels may be used to create an operable connection. For example, the I/O interface 550 may comprise a first communication interface 552 devoted to sending data, packets, or datagrams and a second communication interface 551 devoted to receiving data, packets, or datagrams. Alternatively, the I/O interface 550 may be implemented using a single communication interface.

The network device 500 may be in a listening state. The network device 500 may receive a voice service configuration data through the input interface 551. The controller 530 may initiate, based on the voice service configuration data, an enabled state of the network device, and generate a packet for a remote network device. The output interface 552 may transmit the packet to the remote network device. A voice service may be advertised to multiple VoIP endpoints according to the voice service configuration data. The controller 530 may broadcast or multicast the packet to internet protocol subnets directly connected to the network device 500. The voice service configuration data may include a source priority value, a voice VLAN identifier, and an 802.1p priority and a differentiated services code point for the voice VLAN. The voice service configuration data may include fewer, additional or different data.

The controller 530 may compare source priority values as part of a root election process. For example, the controller 530 accesses a current source priority value from the memory 510 and accesses a received source priority value from the received voice service configuration data. The current source priority value may correspond to a VSDP root device and root voice service configuration in the memory 510. The controller 530 may update, when the received source priority value is less than the current source priority value, the root voice service configuration data based on the received voice service configuration data. The received source priority value may correspond to a device that is remote to the network device, a device that is local to the network device, or a manual configuration.

If the current source priority value equals the received source priority value, the controller 530 may access a hardware address from the memory 510 and access another hardware address from the received voice service configuration data. The hardware address may correspond to a VSDP root device and root voice service configuration in the memory 510. The controller 530 may update, when the other hardware address is smaller than the hardware address, the root voice service configuration data based on the received voice service configuration data.

The controller 530 may send, receive, and/or process voice service information, or voice service configuration data, which may be in the form of VSDP Packets. The controller 530 may receive VSDP packets through the input interface 551, and may send VSDP packets through the output interface 552. The VSDP packets may contain voice service configuration data, voice service information or VSDP voice service advertisements, which the controller 530 stores in the memory 510. The network device 500 may be configured to operate in multiple modes or states. For example, the multiple states may include a disabled state, a listening state, or an enabled state. Default state for a VSDP device may be listening state. When in the listening state, the controller 530 may receive and process incoming VSDP packets, but does not send VSDP packets. When in the enabled state, the controller 530 may send, receive, and/or process incoming VSDP packets. When in the disabled state, a controller does not send VSDP packets and does not process any incoming VSDP packets.

The input device allows a user or administrator to input commands to the network device 510. The input device may be a keyboard, trackball, touch pad, a mouse, or other user input. Alternatively, the input device may be provided remotely at another terminal by way of a network or the Internet.

Figure 6:
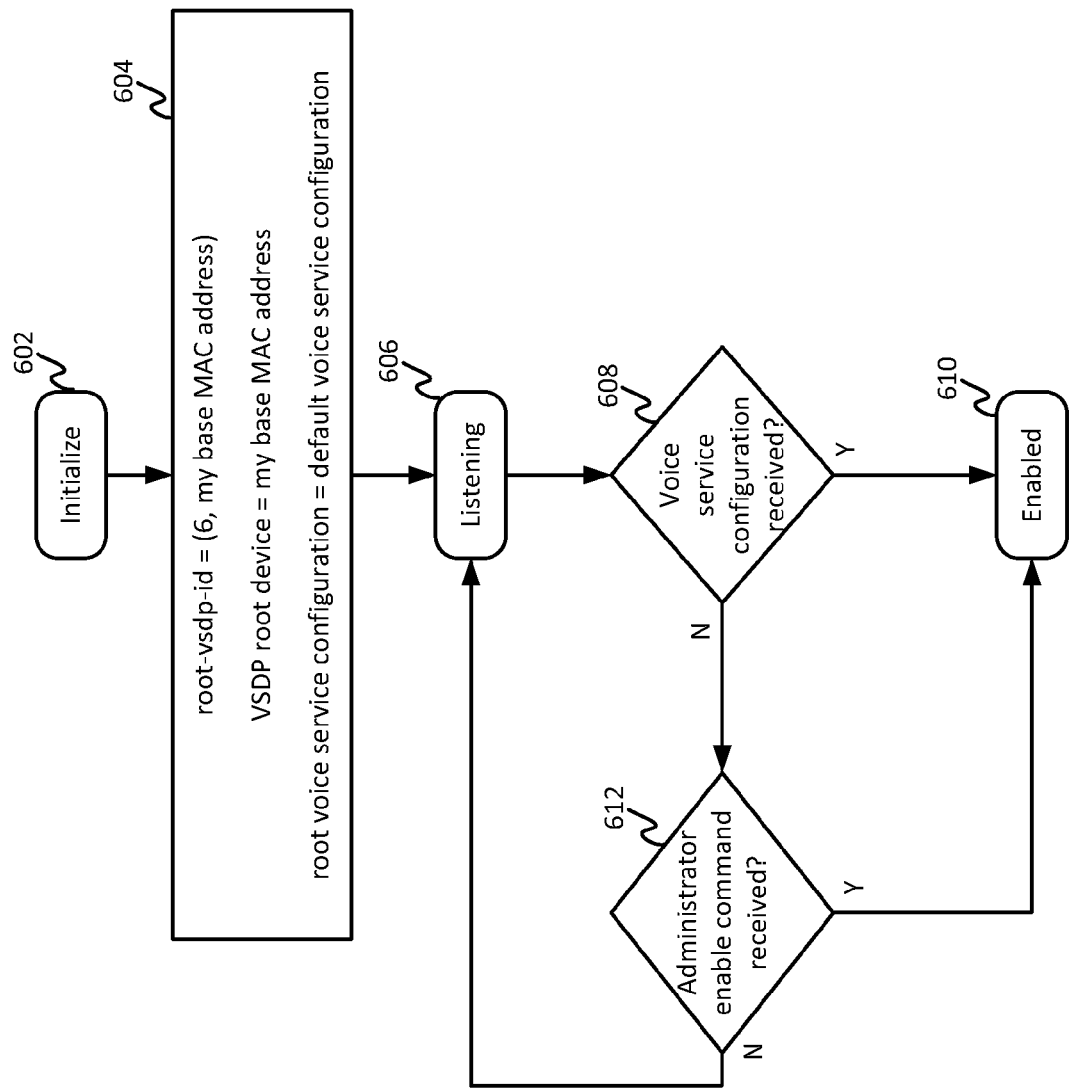
FIG. 6 is a flowchart illustrating operation of a network device using voice service discovery.

FIG. 6 is a flowchart illustrating operation of a network device using voice service discovery. For example, when a VSDP device is initialized 602, the root-vsdp-id value is equal to a source priority of 6 and the base MAC address of the VSDP device; the VSDP device makes the VSDP device the VSDP root device; and the root voice service configuration is the default voice service configuration of the VSDP device 604. Then, the VSDP device initiates the listening state 606 and waits to receive a voice service configuration 608. If a voice service configuration is received, the VSDP device initiates the enabled state 610. Alternatively, an administrator may manually configure the VSDP device 612 to initiate the enabled state 610.

Figure 7:
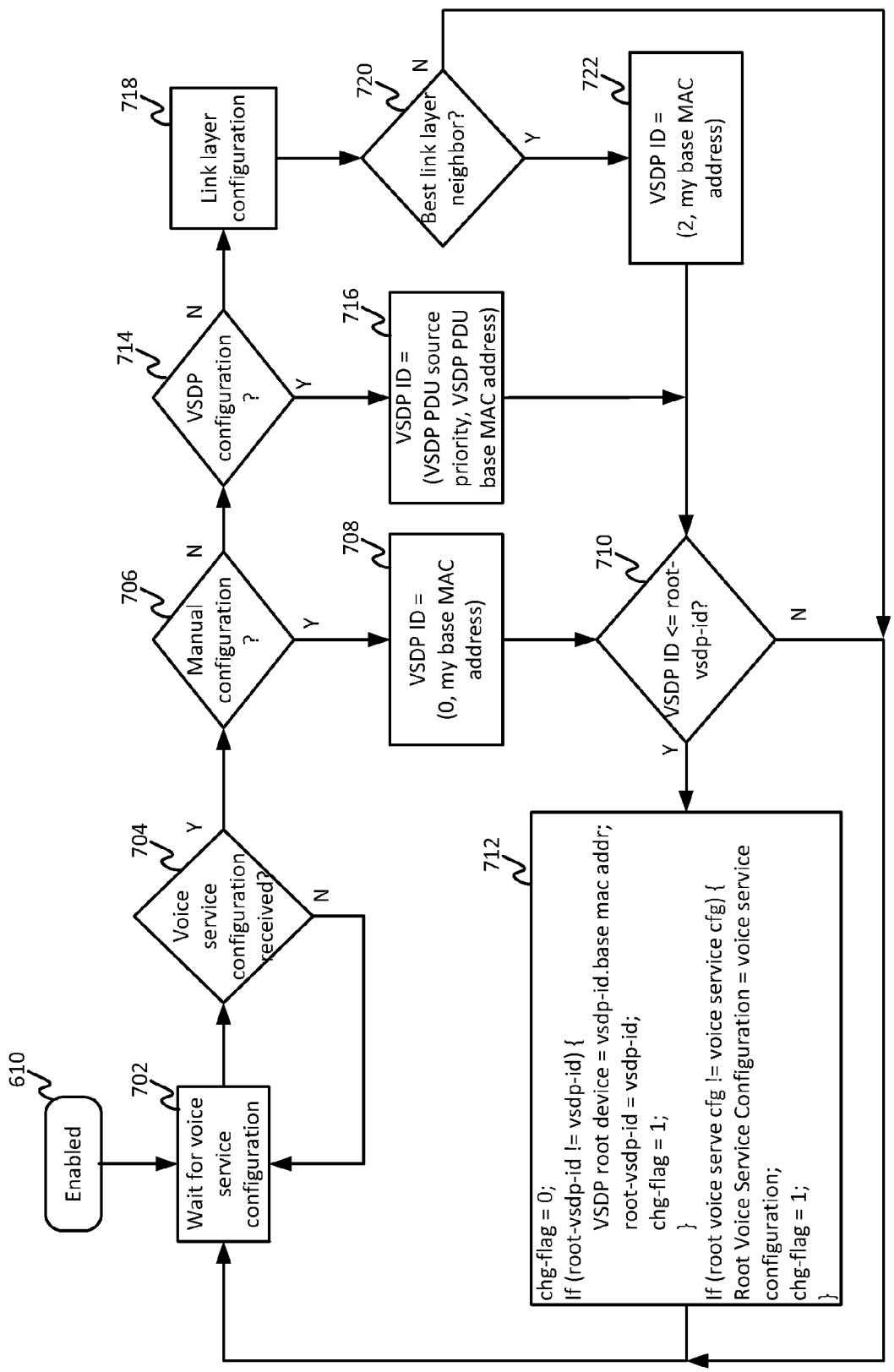
FIG. 7 is a logical diagram of an embodiment of voice service discovery in a network device.

FIG. 7 is a logical diagram of an embodiment of voice service discovery in a network device. For example, when a VSDP device is in the enabled state 610, the VSDP device waits to receive a voice service configuration 702. When the VSDP device receives a voice service configuration 704, and the voice service configuration is a manual configuration, the VSDP ID is 0, the source priority of a manual configuration, and the base MAC address of the VSDP device 708. Then, if the VSDP ID is less than or equal to the root-vsdp-id 710, the VSDP device changes the root-vsdp-id and the root voice service configuration 712 as follows. If the root-vsdp-id is not equal to the VSDP ID, the VSDP device sets the VSDP root device to be the base MAC address stored in the VSDP ID, sets the root-vsdp-id to be the VSDP ID, and sets the change flag to 1, indicating the change in stored values; and if the root voice service configuration is not equal to the voice service configuration, the VSDP device sets the root voice service configuration to be the voice service configuration received, and sets the change flag to 1, indicating the change in values 712. Then, the VSDP device waits to receive the next voice service configuration 702.

When the VSDP device receives a VSDP configuration, the VSDP ID is the source priority and base MAC address stored in the VSDP PDU 716. Then, if the VSDP ID is less than or equal to the root-vsdp-id 710, the VSDP device changes the root-vsdp-id and the root voice service configuration 712, as discussed above, and waits to receive the next voice service configuration 702.

When the VSDP device receives a link layer protocol configuration, the VSDP device determines whether the transmitting device is the VSDP device's best link layer neighbor. If the transmitting device is the best link layer neighbor, then the VSDP ID is 2, the source priority for an active link layer advertisement, and the base MAC address of the VSDP device 722. Then, if the VSDP ID is less than or equal to the root-vsdp-id 710, the VSDP device changes the root-vsdp-id and the root voice service configuration 712, as discussed above, and waits to receive the next voice service configuration 702. If the transmitting device is not the best link layer neighbor to the VSDP device, then the VSDP device does change the root-vsdp-id and root voice service configuration 712. Instead, the VSDP device waits for the next voice service configuration.

Figure 8:
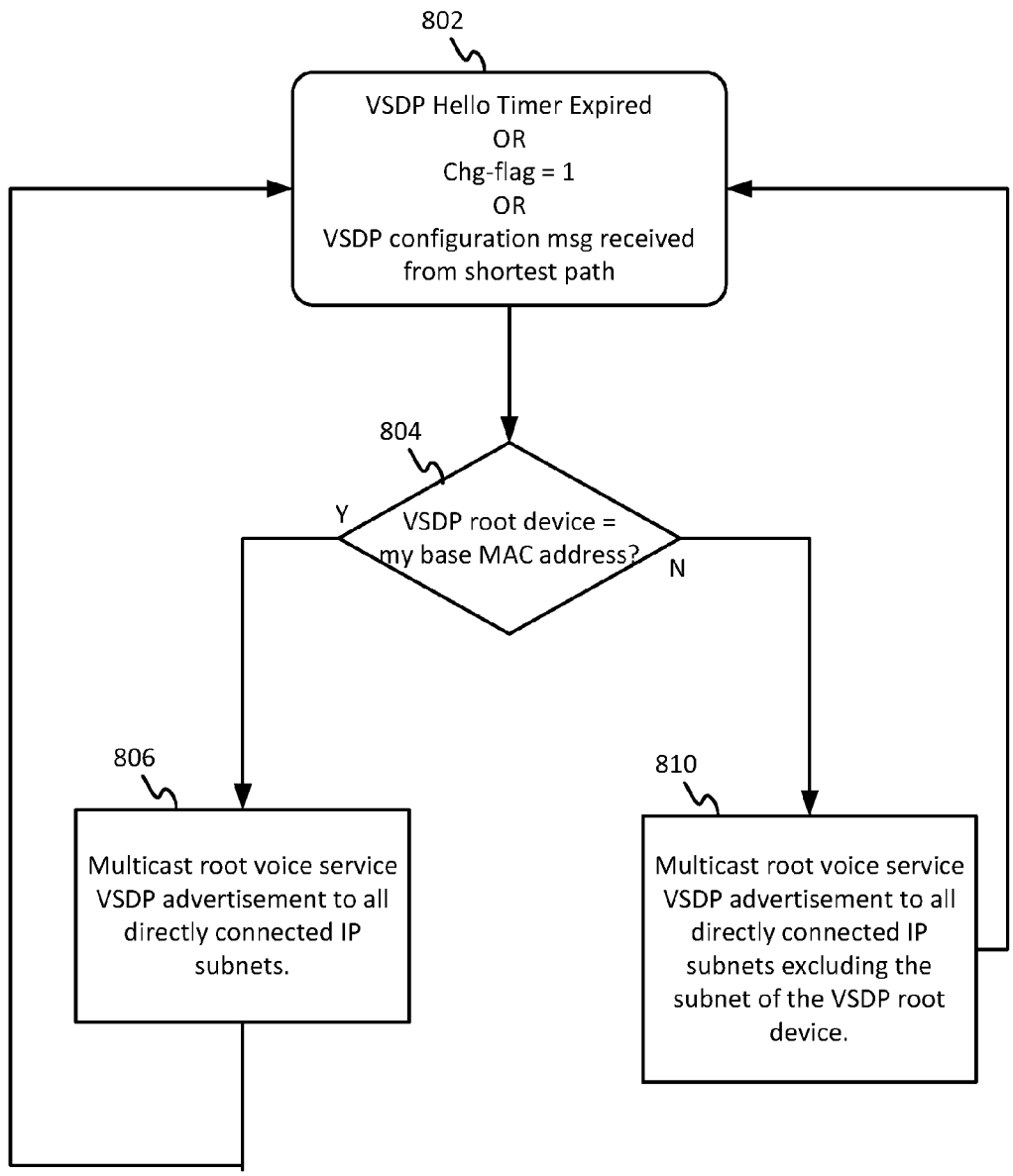
FIG. 8 is a logical diagram of propagation of root voice service configuration in an embodiment of voice service discovery.

FIG. 8 is a logical diagram of propagation of root voice service configuration in an embodiment of voice service discovery. A VSDP device advertises a root voice service VSDP advertisement when the VSDP hello timer expires, the change flag is set to 1, or a VSDP configuration message is received from the shortest path to root 802. Then, the VSDP device determines whether the VSDP root device is the base MAC address of the VSDP device 804. If the VSDP root device is the base MAC address of the VSDP device, then the VSDP device identifies itself as the VSDP root device and multicasts root voice service VSDP advertisements to all directly connected IP subnets 806 and restarts the VSDP hello timer. If the VSDP root device is not the base MAC address of the VSDP device, then the VSDP device is not the root device, and the VSDP device multicasts root voice service VSDP advertisements to all directly connected IP subnets excluding the subnet of the root interface of the shortest path to the VSDP root device 810.

Figure 9:
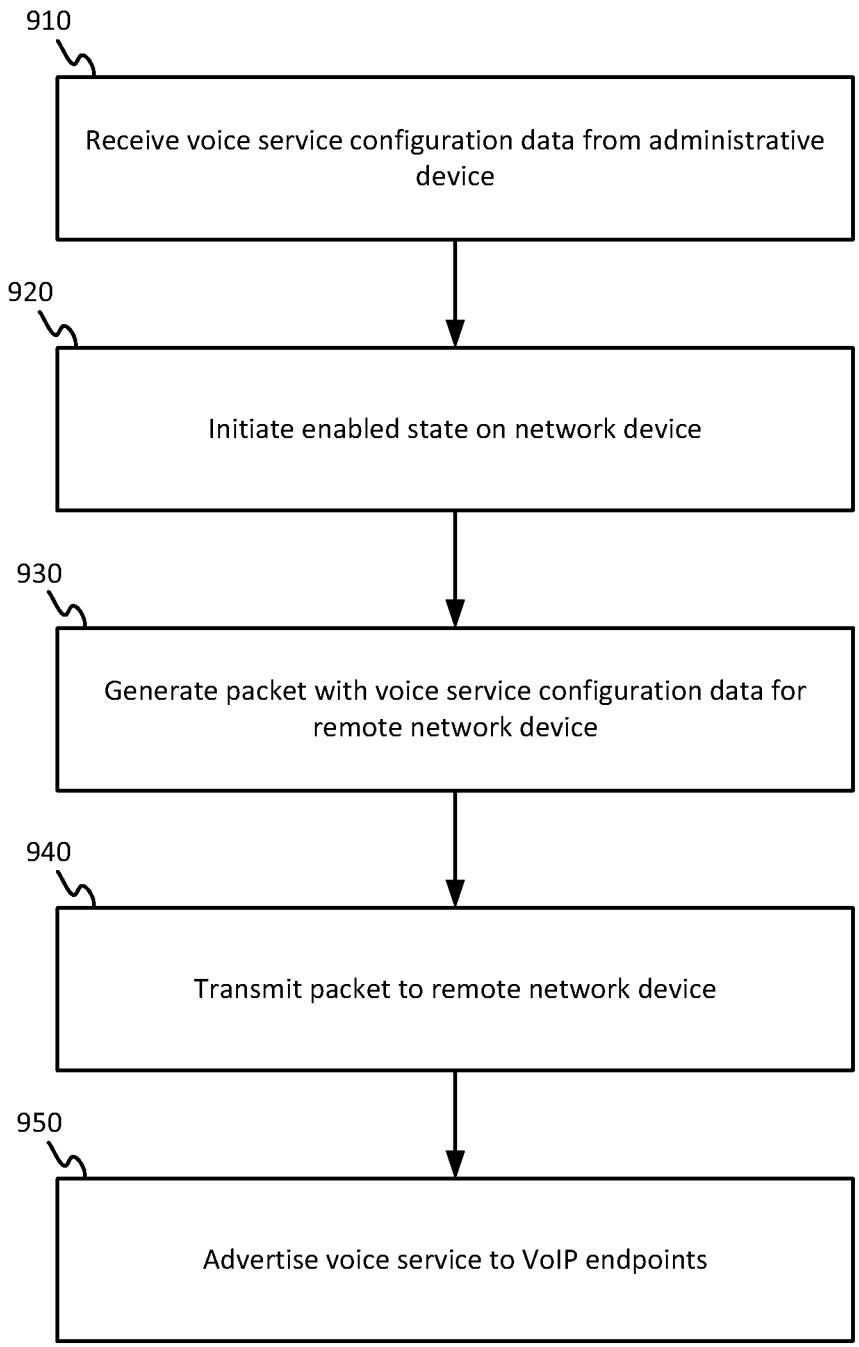
FIG. 9 is an illustration of an example of a flow chart for voice service discovery.

FIG. 9 is an illustration of an example of a flow chart for voice service discovery. Voice service discovery at 910 may include a network device receiving voice service configuration data from an administrative device. The network device may be a VSDP device that sends, receives, and/or processes information in the form of VSDP Packets, VSDP advertisements, link layer protocol packets, or manual configuration. VSDP devices may be configured to operate in multiple modes or states. For example, the multiple states may include a disabled state, a listening state, or an enabled state. Default state for a VSDP device may be listening state. When in the listening state, a VSDP device may receive and process incoming VSDP packets, but does not send VSDP packets.

At 920, voice service discovery may include initiating the enabled state on the network device. When in the enabled state, a VSDP device may send, receive, and/or process incoming VSDP packets. When in the disabled state, a VSDP device does not send VSDP packets and does not process any incoming VSDP packets. The enabled state may be initiated based on a state change event. Various state change events may be defined and stored in the VSDP device. One state change event may be receiving voice service advertisement a non-VSDP device. Another state change event may be being manually configured with a new voice VLAN, and/or new QoS. Another state change event may be receiving a voice service advertisement from a VSDP device.

At 930, voice service discovery may include generating a packet with voice service configuration data for a remote network device. The packet may be a VSDP packet. Voice service configuration data may include information, such as a voice service advertisement, that may be processed by a VSDP device. Voice service advertisements may be from a remote source, including, for example, a device configured to run VSDP. Alternatively, voice service advertisements may be from a local source, including, for example, a manual/static configuration or a device configured to run other discovery protocols.

Voice service discovery at 940 may include transmitting the packet to a remote network device. The packet may be advertised through broadcast to entire IP subnets that are directly connected. Alternatively the packet may be advertised through multicast to a subset of devices in IP subnets that are directly connected.

At 950, voice service discovery may include advertising voice service data to VoIP endpoints. The voice service data may be advertised to VoIP endpoints, for example, through a link layer protocol. As a result, voice service may be provided to the VoIP endpoints and VoIP endpoints may be added, deleted or relocated in the voice VLAN. VoIP endpoints may include, for example, VoIP phones, access points and other VoIP devices.

Voice service discovery may also include broadcasting or multicasting the packet to a plurality of internet protocol subnets directly connected to the network device. The voice service configuration data may include a VLAN 802.1p value, a DSCP value, a voice VLAN identifier, and a source priority value. Alternatively, the voice service configuration data may include fewer, additional or different data.

Voice service discovery may include accessing a current source priority value from a memory of the network device and accessing a received source priority value from the voice service configuration data. Voice service discovery may also include updating, when the received source priority value is less than the current source priority value, the voice service data based on the voice service configuration data. The received source priority value may correspond to a device that is remote to the network device, a device that is local to the network device, or a manual configuration.

When the current source priority value is equal to the received source priority value, voice service discovery may include accessing a hardware address from a memory of the network device, accessing another hardware address from the voice service configuration data, and updating, when the other hardware address is smaller than the hardware address, the voice service data based on the voice service configuration data.

The voice service discovery may include providing voice service to VoIP endpoints with less manual configuration of VSDP devices and VoIP endpoints. Alternatively, the voice service discovery may include providing voice service to VoIP endpoints with dynamic configuration, which requires no manual configuration, of VSDP devices and VoIP endpoints.

Various embodiments described herein can be used alone or in combination with one another. The foregoing detailed description has described only a few of the many possible implementations of the present invention. For this reason, this detailed description is intended by way of illustration, and not by way of limitation.

We claim:

1. A method comprising:
receiving a voice service configuration data at a network device from an administrative device, and the voice service configuration data representative of a voice virtual local area network ("voice VLAN"), wherein the network device is communicatively connected to at least one Voice over Internet Protocol ("VoIP") endpoint of a plurality of VoIP endpoints; initiating, based on the received voice service configuration data, the network device to be part of the voice VLAN; generating, at the network device, a packet for another network device, the packet including the voice service configuration data; automatically transmitting the generated packet from the network device for receipt by the another network device; and connecting by the network device; the at least one VoIP endpoint to the voice VLAN by advertising the voice VLAN to the plurality of voice over internet protocol (VoIP) endpoints according to the voice service configuration data.

2. The method of claim 1, wherein the received voice service configuration data indicates a root device of the voice VLAN, the method further comprising:
accessing a first source priority value from a memory of the network device;
accessing a second source priority value from the received voice service configuration data; and
updating, in response to the second source priority value being less than the first source priority value, the received voice service configuration data to identify the network device as the root device.

3. The method of claim 2, wherein the second source priority value corresponds to a priority of a device that is local or remote to the network device.

4. The method of claim 2, wherein the second source priority value corresponds to a priority of a manual configuration.

5. The method of claim 1, wherein the received voice service configuration data indicates a root device of the voice VLAN, the method further comprising:
accessing a first hardware address from a memory of the network device;
accessing a second hardware address from the received voice service configuration data; and
updating, in response to the second hardware address being smaller than the first hardware address, the received voice service configuration data to identify the network device as the root device.

6. The method of claim 1, wherein the voice service configuration data includes an 802.1p priority value, a differentiated services code point value, a voice virtual local area network identifier, and a source priority value.

7. The method of claim 1, further comprising:
broadcasting or multicasting the packet to a plurality of internet protocol (IP) subnets directly connected to the network device.

8. The method of claim 1, further comprising:
updating, by the network device, the received voice service configuration data, wherein the network device is set as a root device of the voice VLAN.

9. A network device comprising:
an interface device configured to receive voice service configuration data from an administrative device, wherein the network device is an intermediate node in a communication network communicatively connected to at least one Voice over Internet Protocol ("VoIP") endpoint of the plurality of VoIP endpoints; a memory device configured to store the received voice service configuration data; and a processor device configured to initiate a voice over internet protocol (VoIP) service at the network device in response to the received voice service configuration data, and generate a voice service configuration data packet for another network device; and the network device further configured to advertise the VoIP service to the plurality of VoIP endpoints according to the voice service configuration data.

10. The network device of claim 9, wherein the memory includes a first source priority value associated with the network device and the voice service configuration data includes a second source priority value associated with a root device of the VoIP service, and
wherein the processor is configured to set the network device as the root device of the VoIP service and accordingly update the voice service configuration data, in response to the second source priority value being less than the first source priority value.

11. The network device of claim 9, wherein the memory includes a first hardware address associated with the network device and the received voice service configuration data includes a second hardware address, and wherein the processor is configured to update the voice service configuration data to indicate the network device as a new root device of the VoIP service in response to the second hardware address being smaller than the first hardware address.

12. The network device of claim 9, wherein the voice service configuration data includes an 802.1p priority value, a voice VLAN identifier, and a source priority value.

13. The network device of claim 9, wherein the processor is configured to broadcast the packet to a plurality of internet protocol (IP) subnets directly connected to the network device.

14. The network device of claim 9, wherein the processor is configured to multicast the packet to a plurality of internet protocol (IP) subnets directly connected to the network device.

15. A non-transitory computer readable storage medium encoded with instructions capable of being executed by a computer, the non-transitory computer readable storage medium comprising: instructions to receive a voice service configuration data at a network device from an administrative device, wherein a voice virtual local area network (VLAN) includes the network device communicatively connected with one or more endpoint devices, and the network device in a listening state; instructions to initiate, based on the received voice service configuration data, an enabled state of the network device; instructions to generate, at the network device a voice service configuration data packet for another device; instructions to transmit the generated voice service configuration data packet for receipt by the another network device; and instructions to advertise a voice service to a plurality of voice over internet protocol (VoIP) endpoints connected to the another network device.

16. The non-transitory computer readable storage medium of claim 15, further comprising:

instructions to access configuration data of the network device from a memory of the network device, wherein the configuration data comprises a first source priority value;

instructions to access a second source priority value from the received voice service configuration data; and instructions to update, when the second source priority value is less than the first source priority value, the configuration data of the network device based on the received voice service configuration data.

17. The non-transitory computer readable storage medium of claim 15, further comprising:

instructions to access configuration data of the network device, wherein the configuration data comprises a first hardware address;

instructions to access a second hardware address from the received voice service configuration data; and instructions to update, when the second hardware address is smaller than the first hardware address, the configuration data of the network device based on the received voice service configuration data.

18. The non-transitory computer readable storage medium of claim 15, further comprising instructions to broadcast the packet to a plurality of internet protocol (IP) subnets directly connected to the network device.

19. The non-transitory computer readable storage medium of claim 15, further comprising instructions to multicast the packet to a plurality of internet protocol (IP) subnets directly connected to the network device.

* * * * *